A. B. FOWLER.
CLUTCH MECHANISM.
APPLICATION FILED JUNE 14, 1917.
1,386,054.
Patented Aug. 2, 1921.
2 SHEETS—SHEET 1.
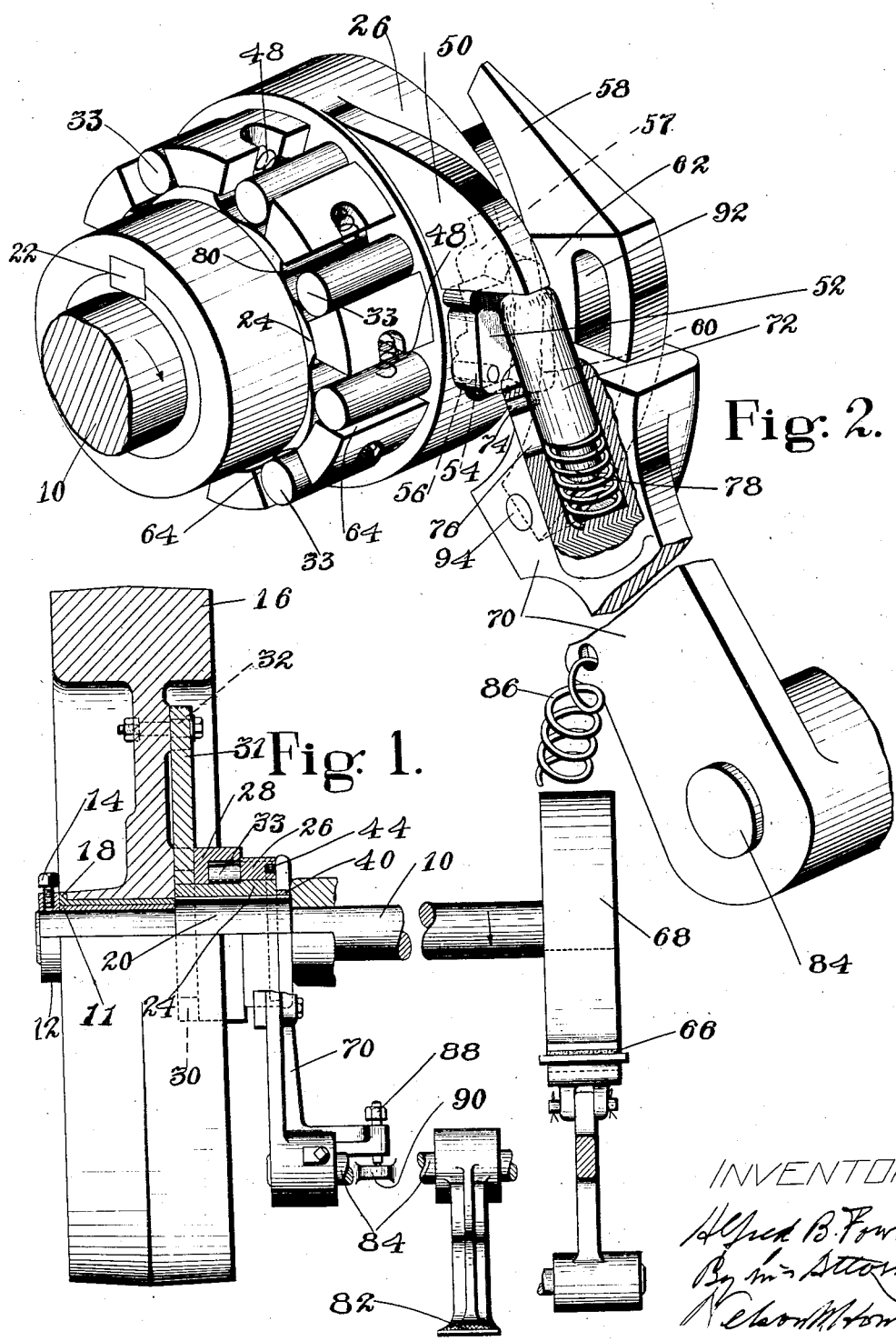
INVENTOR.
Alfred B. Fowler
By his Attorney
Nelson M. Howard

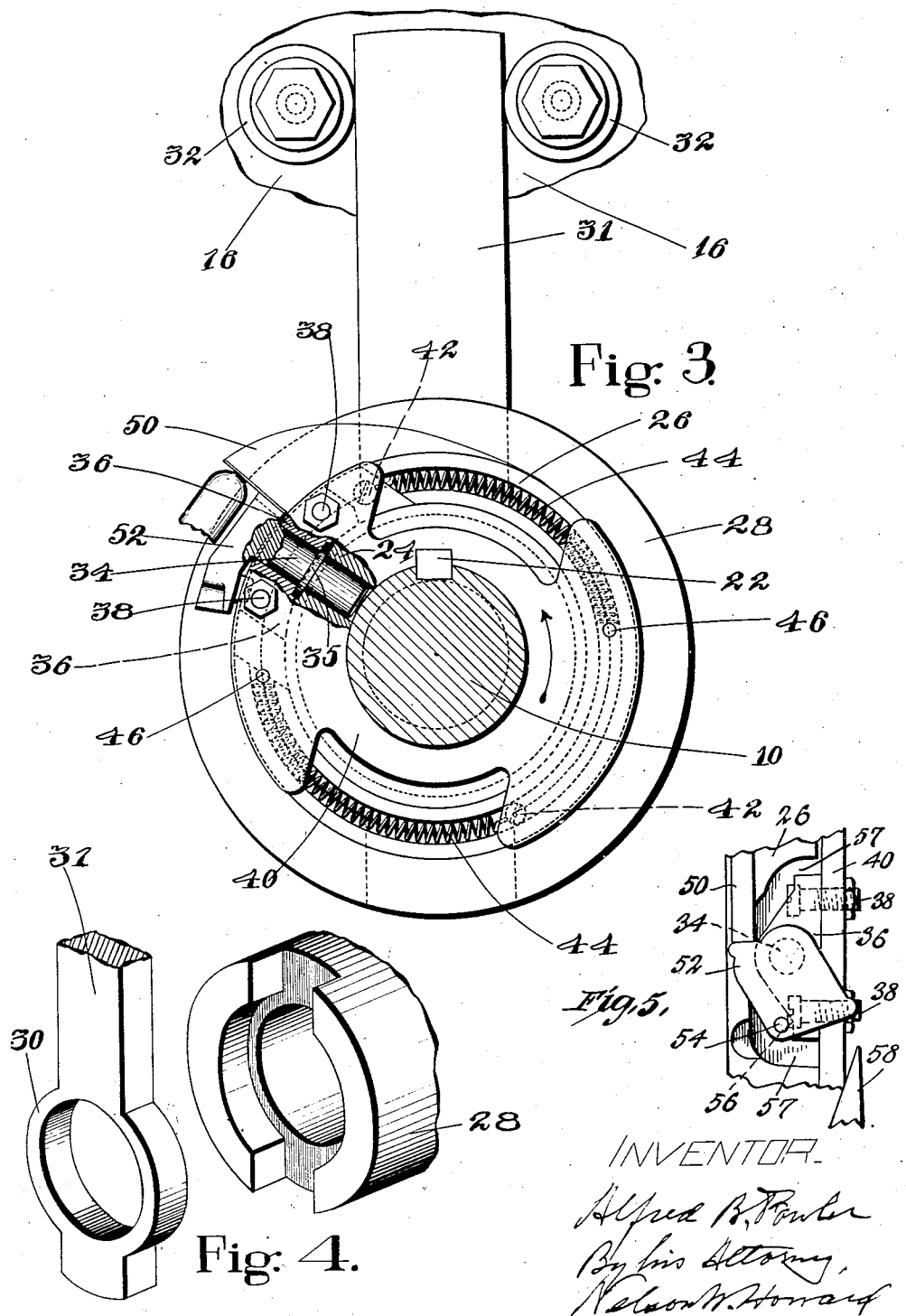

UNITED STATES PATENT OFFICE.

ALFRED B. FOWLER, OF BEVERLY, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

CLUTCH MECHANISM.

1,386,054.  Specification of Letters Patent.  Patented Aug. 2, 1921.

Application filed June 14, 1917. Serial No. 174,650.

*To all whom it may concern:*

Be it known that I, ALFRED B. FOWLER, a citizen of the United States, residing at Beverly, in the county of Essex and State of Massachusetts, have invented certain Improvements in Clutch Mechanisms, of which the following description, in connection with the accompanying drawings, is a specification, like reference characters on the drawings indicating like parts in the several figures.

This invention relates to clutches and particularly to roller clutches of the well-known "Horton" type.

Clutches of this type have been used extensively in machines which are designed to make one revolution and then stop. One difficulty with clutches of this type has been the fact that the clutch could not be disengaged until the stopping position of the machine had been reached and then extraordinary means often had to be employed to overcome the momentum of the machine and prevent it from continuing its motion further. While such difficulty has not always been excessive in machines of light construction, it has been exceeding objectionable in heavy machines having considerable momentum such as, for example, heeling machines of the type illustrated in United States Letters Patent No. 446,383, granted February 10, 1891, to C. W. Glidden *et al.* in which patent is shown the specific form of roller clutch upon which the present invention is an improvement.

In heeling machines of this type, the driving pulley or fly-wheel weighs from 400 to 600 pounds. Such a heavy weight causes wear that makes the pulley, and the clutch ring which is mounted on it, become eccentric to the shaft and to the clutch member secured to the shaft. This results in one clutch roller engaging before the others so that it takes most of the load and becomes wedged into place so tightly that considerable difficulty is experienced in disengaging the roller, with consequent wear upon the parts. Often the eccentricity becomes so great that this roller, which is the one at the top when the machine is stopped, can not be disengaged and it has to be removed from the machine in order to allow the clutch to operate and to obtain also a more nearly equal distribution of the load among the other rollers under such conditions.

One of the principal objects of the present invention is to overcome the above difficulties and secure the advantages of the Horton type of clutch for such work by so changing its construction that the clutch may be disengaged some time before the revolution of the machine has been completed, so that the momentum of the machine may be employed in useful work instead of being wasted by heavy brakes and immovable stops, with the consequent shock and ultimate damage to the machine.

A further object of the invention is so to design a clutch of this kind that it can be used with heavy fly wheels and maintain the clutch members in concentric relation to each other, even though the driving pulley or fly wheel may become worn and eccentric to the shaft. This object is accomplished by connecting one of the clutch members to one of the rotary members, in conjunction with which the clutch operates, in such a manner that these parts are in radially yielding driving contact with each other during the revolution of the parts. Furthermore, this feature is useful in any clutch which transmits rotation from one rotary member to another where the rotary members are, or may become, out of coaxial alinement with each other.

Another object of the invention is to provide means for adjusting the mechanism so that the clutch may be thrown out of operation at any desired point in the cycle of the machine.

Another object of the invention is to design a clutch of this type so that the machine may be gradually slowed down and brought to rest against a positive stop if the momentum is not entirely used up or if the brake fails to operate properly.

Other objects of the invention and the features employed to accomplish such objects will be apparent when the following description is considered in connection with the accompanying drawings. The invention is not limited to the specific construction shown and described but its scope is clearly pointed out in the appended claims.

In the drawings:

Figure 1 is a side elevation, partly in section, of the clutch, driving pulley or flywheel, brake and tr idle mechanism;

Fig. 2 is an enlarged perspective view of the rollers, roller cage, and the parts for controlling the movement of the roller cage;

Fig. 3 is an end elevation of the clutch, partly in section, viewed from the right of Fig. 1 but with the driving pulley removed;

Fig. 4 is a separated view of the means for driving one of the clutch members; and Fig. 5 is a view showing certain details of construction.

A driving shaft 10 has upon it a loose sleeve 11. Upon this sleeve the driving pulley or fly wheel 16 revolves continuously, the pulley being provided with a bushing 18, which fits the pulley tightly and which is a loose fit upon the sleeve 11. The pulley and loose sleeve are retained longitudinally on the shaft by the collar 12, which is retained in position by the set screw 14, and by the enlarged portion 20 of the shaft. The enlarged portion 20 has a keyway in which is a key 22 securing to the shaft the recessed (or cam) member 24 of the clutch. The recessed member 24 also has two smooth cylindrical portions, upon one of which the roller cage 26 is loosely mounted and upon the other of which the ring or smooth member 28 of the clutch and its driving member 30 are also loosely mounted. The member 28 is cut away to receive the member 30, as shown in Fig. 4, so that both will revolve as one part upon their cylindrical portion of the recessed member 24. The member 30 is provided with an arm 31 for receiving the motion that it transmits to the member 28. Motion is given to the outer end of this arm 31 by the two rolls 32 between which the arm extends, the rolls being mounted upon the continuously moving driving pulley or fly-wheel 16. It will thus be seen that the connection between the pulley 16 and the members 30 and 28 is radially sliding or yielding although a positive driving connection exists between the two and that, no matter how eccentric the pulley becomes by the wearing of the bushing 18 and sleeve 14, the smooth member 28 and the recessed member 24 of the clutch will be maintained in concentric relation with each other so that each of the clutch rollers 33 will take its share of the load when the clutch is thrown into operation.

A cutaway disk 40 is also secured to the shaft 10 by the key 22. This disk 40 carries two pins 42, to each of which is secured a tension spring 44. The other ends of these springs are secured to the roller cage 26 by means of pins 46. The tension springs 44 tend to move the roller cage, relatively to the recessed member 24, in the forward direction in which the shaft 10 is driven (as indicated by the arrows). When the relative forward rotation of the roller cage, due to the springs 44, is permitted, by starting the machine in the manner to be described later, the clutch rollers 33 are pushed forward with the cage by the light compression springs 48 which act behind each roller. The relative forward rotation is of sufficient amount to free the rollers entirely from the rear faces 64 of the roller cage and permit all the rollers to come into engagement with the driving and driven members 28 and 24 so that each roller will take its share of the load. This relative rotation is limited, however, in a manner to be described.

The roller cage 26 is provided with a lug 50. A lever or block 52, having a cylindrical shank 34 with an enlarged or collar portion 35, is pivotally mounted in the recessed clutch member 24 (see Fig. 3), being retained in position by a yoke 36 secured by bolts 38 to the disk 40, the yoke engaging the shank 34 and collar portion 35 so that the block may turn about its shank without moving in a direction longitudinally of the shank. The lever 52 has one arm or face which is arranged to engage the lug 50. The springs 44 thus move the roller cage forward against this lever 52 which turns until a pin 54 in it engages the yoke at 56 in the side of the space 57 which is cut in the roller cage 26 to allow it to clear the yoke 36 when it moves relatively to the recessed or cam member 24.

To disengage the rollers, the roller cage is moved relatively backward into disengaging position by moving the lever 52 against the forward pressure of the lug 50. The movement of the lever 52 to cause this disengagement may be produced in any convenient way and, in the illustrated embodiment of the invention, it is caused by a wedge-piece 58 engaging the arm or corner 60 of the lever 52, the continuing motion of the machine causing the arm 60 to ride up upon the wedge-piece 58 and cause disengagement to take place. After the arm reaches the end of the wedge-shaped portion of the wedge-piece 58 it rides upon the extension 62 thereof so that the rollers are maintained in disengaged position while the machine continues to turn under its own momentum as the momentum is being absorbed in useful work. It will thus be seen that the rollers are disengaged much earlier in the cycle of the machine than in former constructions of Horton clutches, so that the machine can rotate to a substantial extent after the clutch is disengaged. It is believed that, previous to the present invention, no form of one-revolution roller clutch has been devised that will permit this new and useful result to be obtained.

In order to disengage the clutch a sufficient time before it is desired to have the machine stop, so that its momentum will be substantially used up in useful work, the wedge piece 58 is adjustably mounted in a segmental slot in the lever 70, it being held in adjusted position by means of screws which pass through the slots 92 of the wedge piece into the lever 70. The end of one of the holes in which a securing screw is located, is shown at 94 in Fig. 2.

As the brake 66, by acting upon the brake wheel 68 in the manner described in said Glidden patent, sometimes may fail to overcome the remaining momentum of the machine, because of either wear, wrong adjustment of the parts or varying resistance in the machine itself (as when the machine is tripped with no work in it), it is necessary to provide a safety device to prevent the machine from turning so far that the lever 52 will pass beyond the straight extension 62 of the wedge piece and cause reengagement of the clutch members. This safety device consists of a shouldered plunger 72 which is mounted, adjacent to the wedge member, in a recess in the arm 70. This plunger is retained in the recess by means of the screw 74 acting in the slot 76. A coil spring 78 beneath the shoulder of the plunger causes the plunger to yield if the roller cage continues to move until the lug 50 strikes it. After the plunger has yielded a certain amount, its lower end strikes the bottom of the recess and this causes it to act as a fixed stop beyond which the roller cage cannot possibly move. This positively stops the driven parts of the machine because the rollers then strike the rear ends 80 of the recesses of the recessed member 24 which is keyed to the shaft.

In order to start the machine, the treadle 82 is depressed and this causes the treadle shaft 84 to turn in its bearings upon the frame of the machine. This moves the lever 70 in a direction away from the shaft 10 so that the extension 62 of the wedge-piece 58 is moved away from the lever 52. The action of the tension springs 44 then causes the roller cage 26 to move forwardly until the stop pin 54 reaches the yoke therefor at 56. This forward movement of the roller cage causes the rollers to engage the driving and driven members in the usual manner, as above described. As soon as the machine starts, the operator, unless he wishes to have the machine make more than one revolution, removes his foot from the treadle. The spring 86 then brings the lever 70 into its original position and also returns the treadle to its original position because both are fixed to the shaft 84. The wedge piece 58 is thus brought into the path of movement of the arm 60 of the lever 52, preparatory to disengaging the clutch when the cycle of the machine is nearly completed. The lever 70 is provided with an adjustable stop screw 88 which strikes the lug 90 fixed to the frame of the machine. By adjusting the stop screw, the lever 70 can be adjusted to bring the wedge piece 58 into proper position to act upon the lever 52.

While the term roller is used throughout the specification and claims, it should be understood that this term is broad enough to include balls, which are often used instead of rollers in Horton clutches.

Having thus described the invention, what is claimed as new and desired to be secured by Letters Patent of the United States is:—

1. A clutch mechanism, having, in combination, a shaft, a series of friction rollers, a driving member loose upon the shaft, a driven member fixed to the shaft, one of said members having a series of recesses for the rollers, a cage for the rollers movable to a limited extent relatively to the recessed member to cause the rollers to engage or disengage the driving and driven members, and means for effecting such relative movement, said means being constructed and arranged to permit free rotation of the driven member until its momentum is substantially absorbed, after disengagement takes place.

2. A clutch mechanism, having, in combination, a shaft, a series of friction rollers, a driving member and a driven member, one member being loose upon the shaft and the other being fixed thereto, one of said members having a series of recesses for the rollers, a cage for the rollers movable to a limited extent relatively to the recessed member to cause the rollers to engage or disengage the driving and driven members, means for effecting such relative movement, said means being constructed and arranged to permit free rotation of the driven member to a substantial extent after disengagement takes place, and means to bring the driven member to rest while the cage is in disengaging position.

3. A clutch mechanism, having, in combination, a shaft, a series of friction rollers, a driving member loose upon the shaft, a driven member, fixed to the shaft, the driven member having a series of recesses for the rollers, a cage for the rollers movable to a limited extent relatively to the driven member to cause the rollers to engage or disengage the driving and driven members, and means for effecting such relative movement, said means being constructed and arranged to permit free rotation of the driven member until its momentum is substantially absorbed, after disengagement takes place.

4. A clutch mechanism, having, in combination, a shaft, a series of friction rollers, a driving member and a driven member, one member being loose upon the shaft and the other being fixed thereto, the driven member having a series of recesses for the rollers, a cage for the rollers movable to a limited extent relatively to the driven member to cause the rollers to engage or disengage the driving and driven members, a lever pivotally mounted on the driven member and in operative relation to the cage, and a wedge-piece arranged to be moved into the path of the lever to turn it and thereby move the cage to disengaging position.

5. A clutch mechanism, having, in combination, a shaft, a series of friction rollers, a driving member and a driven member, one member being loose upon the shaft and the other being fixed thereto, the driven member having a series of recesses for the rollers, a cage for the rollers movable to a limited extent relatively to the driven member to cause the rollers to engage or disengage the driving and driven members, a lever pivotally mounted on the driven member and in operative relation to the cage, a wedge-piece arranged to be moved into the path of the lever to turn it and thereby move the cage to disengaging position, and means for adjusting the wedge-piece to vary the point at which disengagement takes place.

6. A clutch mechanism, having, in combination, a shaft, a series of friction rollers, a driving member and a driven member, one member being loose upon the shaft and the other being fixed thereto, the driven member having a series of recesses for the rollers, a cage for the rollers movable to a limited extent relatively to the driven member to cause the rollers to engage or disengage the driving and driven members, a lever pivotally mounted on the driven member and in operative relation to the cage, a wedge-piece arranged to be moved into the path of the lever to turn it and thereby move the cage to disengaging position, and spring-operated means to return the cage to engaging position when the wedge-piece is moved away from said lever.

7. A clutch mechanism, having, in combination, a shaft, a series of friction rollers, a driving member and a driven member, one member being loose upon the shaft and the other being fixed thereto, the driven member having a series of recesses for the rollers, a cage for the rollers movable to a limited extent relatively to the driven member to cause the rollers to engage or disengage the driving and driven members, a lever pivotally mounted on the driven member and in operative relation to the cage, a wedge-piece arranged to be moved into the path of the lever to turn it and thereby move the cage to disengaging position and means to maintain the cage in disengaging position until the driven member comes to rest and thereafter until said means is moved away from said lever.

8. A clutch mechanism, having, in combination, a shaft, a series of friction rollers, a driving member and a driven member, one member being loose upon the shaft and the other being fixed thereto, the driven member having a series of recesses for the rollers, a cage for the rollers movable to a limited extent relatively to the driven member to cause the rollers to engage or disengage the driving and driven members, a lever pivotally mounted on the driven member and in operative relation to the cage, a wedge-piece arranged to be moved into the path of the lever to turn it and thereby move the cage to disengaging position, an extension on the wedge-piece arranged to maintain the cage in disengaging position until the driven member comes to rest and thereafter until the extension is moved away from said lever, and means to bring the driven member to rest while the cage is in disengaging position.

9. A clutch mechanism, having, in combination, a shaft, a series of friction rollers, a driving member and a driven member, one member being loose upon the shaft and the other being fixed thereto, the driven member having a series of recesses for the rollers, a cage for the rollers movable to a limited extent relatively to the driven member to cause the rollers to engage or disengage the driving and driven members, a lever pivotally mounted on the driven member and in operative relation to the cage, a wedge-piece arranged to be moved into the path of the lever to turn it and thereby move the cage to disengaging position, an extension on the wedge-piece arranged to maintain the cage in disengaging position until the driven member comes to rest and thereafter until the extension is moved away from said lever, a brake to bring the driven parts to rest under normal conditions and a safety stop to bring the driven parts to rest while the cage is in disengaging position if the brake fails to operate properly.

10. A clutch mechanism, having, in combination, a shaft a series of friction rollers, a driving member and a driven member, one member being loose upon the shaft and the other being fixed thereto, the driven member having a series of recesses for the rollers, a cage for the rollers movable to a limited extent relatively to the driven member to cause the rollers to engage or disengage the driving and driven members, a lever pivotally mounted on the driven member and in operative relation to the cage, a wedge-piece arranged to be moved into the path of the lever to turn it and thereby move the cage to disengaging position, an extension on the wedge-piece arranged to maintain the cage in disengaging position until the driven member comes to rest and thereafter until the extension is moved away from said lever, a brake to bring the driven parts to rest under normal conditions and a safety stop acting at first yieldingly and then positively to bring the driven parts to rest if the brake fails to operate properly.

11. A clutch mechanism, having, in combination, a shaft, a series of friction rollers, a driving pulley, two clutch members, one member being mounted to turn with the pulley and the other being mounted to turn with the shaft, means for maintaining the clutch members in concentric relation with each other even though the driving pulley becomes eccentric to the shaft, one clutch member having a series of recesses for the rollers, a cage for the rollers movable to a limited extent relatively to the recessed member to cause the rollers to engage or disengage the clutch members, and means for effecting such relative movement, said means being constructed and arranged to permit free rotation of the driven clutch member until its momentum is substantially absorbed, after disengagement takes place.

12. A clutch mechanism, having, in combination, a shaft, a series of friction rollers, a driving pulley, a driving clutch-member and a driven clutch member, one clutch-member being loose upon the shaft and the other being fixed thereto, means for maintaining the clutch-members in concentric relation with each other even though the driving pulley become eccentric to the shaft, the driven clutch-member having a series of recesses for the rollers, a cage for the rollers movable to a limited extent relatively to the driven clutch-member to cause the rollers to engage or disengage the driving and driven clutch-members, a lever pivotally mounted on the driven clutch-member and in operative relation to the cage, a wedge-piece arranged to be moved into the path of the lever to turn it and thereby move the cage to disengaging positions and means arranged to maintain the cage in disengaging position until the driven clutch-member comes to rest and thereafter until said means is moved away from said lever.

13. A clutch mechanism, having, in combination, a shaft, a series of friction rollers, a driving pulley, two clutch members, the first member being mounted to turn with the shaft and the second member being mounted concentrically with the first, a radially yielding driving connection between the pulley and the second member, one clutch member having a series of recesses for the rollers, a cage for the rollers movable to a limited extent relatively to the recessed member to cause the rollers to engage or disengage the clutch members, and means for effecting said relative movement, said means being constructed and arranged to permit free rotation of the driven clutch member until its momentum is substantially absorbed after disengagement takes place.

14. A clutch mechanism, having, in combination, a shaft, a driving pulley, two clutch members, one member being mounted to turn with the pulley and the other being mounted to turn with the shaft, a series of friction rollers, one clutch member having a series of recesses for the rollers, a cage for the rollers movable to a limited extent relatively to the recessed clutch member to cause the rollers to engage or disengage the clutch members, means for effecting such relative movement, and means for maintaining the clutch members in concentric relation with each other even though the driving pulley becomes eccentric to the shaft.

In testimony whereof I have signed my name to this specification.

ALFRED B. FOWLER.